(12) United States Patent
Bejerano et al.

(10) Patent No.: US 7,472,314 B2
(45) Date of Patent: Dec. 30, 2008

(54) SYSTEM AND METHOD FOR MONITORING LINK DELAYS AND FAULTS IN AN IP NETWORK

(75) Inventors: Yigal Bejerano, Springfield, NJ (US); Rajeev Rastogi, New Providence, NJ (US)

(73) Assignee: Alcatel - Lucent USA Inc., Murray Hill, NJ (US)

( * ) Notice: Subject to any disclaimer, the term of this patent is extended or adjusted under 35 U.S.C. 154(b) by 579 days.

(21) Appl. No.: 10/672,204

(22) Filed: Sep. 26, 2003

(65) Prior Publication Data

US 2005/0081116 A1 Apr. 14, 2005

(51) Int. Cl.
*G06F 11/00* (2006.01)
(52) U.S. Cl. .............................. 714/47; 714/4
(58) Field of Classification Search ................ 709/223, 709/224, 238, 242; 714/23, 43, 4, 47
See application file for complete search history.

(56) References Cited

U.S. PATENT DOCUMENTS

| 6,363,056 | B1 * | 3/2002 | Beigi et al. | 370/252 |
| 6,836,465 | B2 * | 12/2004 | Rajan et al. | 370/238 |
| 2001/0056486 | A1 * | 12/2001 | Kosaka | 709/224 |
| 2002/0143914 | A1 * | 10/2002 | Cihula | 709/223 |
| 2004/0230680 | A1 * | 11/2004 | Jain et al. | 709/226 |
| 2006/0239199 | A1 * | 10/2006 | Blair et al. | 370/248 |

OTHER PUBLICATIONS

Perlman, Radia. "Interconnections, Bridges, Routers, Switches and Internetworking Protocols, Second Edition." Sep. 14, 1999. Addison Wesley. Section 8.3: "Hop Count".*
Mauro, Douglas. "Essential SNMP, first edition." Jul. 2001. O'Riely Publishers. Chapter 9: "Polling and Thresholds".*
Brodie et al. "Optimizing Probe Selection for Fault Localization." 12th Int. Workshop on Distributed Systems: Operations and Management, Nancy, France, Oct. 15-17, 2001.*
Brodie et al. "Intelligent Probing: a Cost-Effective Approach to Fault Diagnosis in Computer Networks." IBM Systems Journal, vol. 41, No. 3, 2002.*
Bejerano et al. "Robust Monitoring of Link Delays and Faults in IP Networks." 22nd Annual Joint Conf. of IEEE Computer and Communications Societies, Mar. 30-Apr. 3, 2003.*
V. Chvatal; "A Greedy Heuristic for the Set-Covering Problem" Mathematics of Operations Research; vol. 4, No. 3, 1979; pp. 233-235.
SNMP Interface, "Cisco BTS 10200 Softswitch Operations and Maintenance Guide" Chapter 17, Release 4.5, Oct. 13, 2006, pp. 17-1-17-8 (plus title pages).

(Continued)

*Primary Examiner*—Robert Beausoliel
*Assistant Examiner*—Philip Guyton

(57) ABSTRACT

A system for, and method of, monitoring link delays and faults in an IP network. In one embodiment, the system includes: (1) a monitoring station identifier that computes a set of monitoring stations that covers links in at least a portion of the network and (2) a probe message identifier, coupled to the monitoring station identifier, that computes a set of probe messages to be transmitted by at least ones of the set of monitoring stations such that the delays and faults can be determined.

18 Claims, 3 Drawing Sheets

OTHER PUBLICATIONS

Van Jacobson; "Pathchar—a tool to infer characteristics of Internet paths"; Apr. 1997;(ftp:/ftp.ee.lbl.gov/pathcar;) 21 Pages.

Anoop Reddy, Ramesh Govindan, Deborah Estrin; "Fault Isolation in Multicast Trees"; Proceedings of the ACM SIGCOMM, 2000; 12 pages.

Breitbart, et al.; "Efficiently Monitoring Bandwidth and Latency in IP Networks"; IEEE Infocom 2001; pp. 933-942.

Kevin Lai & Mary Baker; "Measuring Bandwidth"; IEEE Infocom; Mar. 1999; pp. 235-245.

Bu et al; "Network Tomography on General Topologies"; Proceedings of ACM Sigmetrics, Jun. 2002; 10 Pages.

Jamin et al.; "On the Placement of Internet Instrumentation"; IEEE Infocom 2000; Tel Aviv, Israel, Mar. 2000; pp. 295-304.

Robert L. Carter and Mark E. Crovella; "Server Selection Using Dynamic Path Characterization in Wide-Area Networks"; IEEE Infocom 1999; Kobe, Japan Apr. 1997; pp. 1014-1021.

Adler et al.; "Tree Layout for Internal Network Characterizations in Multicast Networks"; Proceedings of NGC 2001, London, US, Nov. 2001; 16 Pages.

Dovrolis et al.; "What do packet dispersion techniques measure?"; Proceedings of IEEE Infocom 2001, Alaska, Apr. 2001; pp. 905-914.

Francis et al.; "An Architecture for a Global Internet Host Distance Estimation Service"; IEEE Infocom 99, New York City, NY, Mar. 1999; pp. 210-217.

Shavitt et al.; "Computing the Unmeasured: An Algebraic Approach to Internet Mapping"; IEEE Infocom 2001, Alaska, Apr. 2001; pp. 1646-1654.

Mark Dilman and Danny Raz; "Efficient Reactive Monitoring"; IEEE Infocom 2001; Alaska, Apr. 2001; pp. 1012-1019.

\* cited by examiner $S \leftarrow \emptyset, C \leftarrow Z$
While $C \neq \emptyset$ do
    $Q \leftarrow \arg\max_{Q_v \in \mathcal{Q}-S} |Q_v \cap C|$
    $S \leftarrow S \cup \{Q\}$
    $C \leftarrow C - Q$
End While
Return $S$ (a) The Graph G (V.E.)

(b) The RT $T_{s1}$ of node $s_1$.

(c) The RT $T_{s2}$ of node $s_2$.

(d) The RTS $T_{s1}$ and $T_{s2}$ when link (a,b) fails.

$S \leftarrow \emptyset$
$u\ total \leftarrow mK$
While $u\ total > 0$ do
    For every $Y_j \in \mathcal{Y}$ do
        $u_j \leftarrow K - min\ \{K, |\bigcup(S) \cap Y_j|\}$
    For every $Q_i \in \mathcal{Q} - S$ do
        $n_i = \sum_{j=1}^{m} min\ \{u_j, |Q_i \cap (Y_i - \bigcup(S))|\}$
    $Q_i^* \leftarrow arg\ max_{Q_i \in \mathcal{Q}-S}\ n_i$
    $S \leftarrow S \cup \{Q_i^*\}$
    $u\ total \leftarrow u\ total - n_i^*$
End While
Return $S$

FIG. 5

SYSTEM AND METHOD FOR MONITORING LINK DELAYS AND FAULTS IN AN IP NETWORK

TECHNICAL FIELD OF THE INVENTION

The present invention is directed, in general, to computer network management and, more specifically, to a system and method for monitoring link delays and faults in an Internet Protocol (IP) network.

BACKGROUND OF THE INVENTION

The demand for sophisticated tools for monitoring network utilization and performance has been growing rapidly as Internet Service Providers (ISPs) offer their customers more services that require quality of service (QoS) guarantees and as ISP networks become increasingly complex. Tools for monitoring link delays and faults in an IP network are critical for numerous important network management tasks, including providing QoS guarantees to end applications (e.g., voice over IP), traffic engineering, ensuring service level agreement (SLA) compliance, fault and congestion detection, performance debugging, network operations and dynamic replica selection on the Web. Consequently, a recent flurry of both research and industrial activity has been focused on developing novel tools and infrastructures for measuring network parameters.

Existing network monitoring tools can be divided into two categories. The first category contains node-oriented tools for collecting monitoring information from network devices (routers, switches and hosts) using Simple Network Management Protocol/Remote MONitoring ("SNMP/RMON") probe messages (see, Stallings, "SNMP, SNMPv2, SNMPv3, and RMON 1 and 2," Addison-Wesley Longman Inc., 1999, (Third Edition), or the Cisco NetFlow tool (see, "NetFlow Services and Applications," Cisco Systems, 1999 ). These are useful for collecting statistical and billing information and for measuring the performance of individual network devices (e.g., link bandwidth usage). However, in addition to requiring monitoring agents to be installed at every device, these tools cannot monitor network parameters that involve several components, such as link or end-to-end path latency.

The second category contains path-oriented tools for connectivity and latency measurement, such as "ping," "traceroute" (see, e.g., Richard, "TCP/IP illustrated," Addison-Wesley Publishing Company, 1994) and "skitter" (see, e.g., Cooperative Association for Internet Data Analysis (CAIDA), http://www.caida.org/), and tools for bandwidth measurement, such as "pathchar," (see, e.g., Jacobsen, "Pathchar—A Tool to Infer Characteristics of Internet Paths," April 1997, ftp:/ftp.ee.lbl.gov/pathchar), "Cprobe," (see, e.g., Carter, et al., "Server Selection Using Dynamic Path Characterization in Wide-Area Networks," in Proceedings of IEEE INFOCOM '99, Kobe, Japan, April 1997) "Nettimer," (see, e.g., Lai, et al., "Measuring Bandwidth," in Proceedings of IEEE INFOCOM '99, New York City, N.Y., March 1999) and "pathrate" (see, e.g., Dovrolis, et al., "What Do Packet Dispersion Techniques Measure?," in Proceedings of IEEE INFOCOM '2001, Alaska, April 2001). As an example, skitter sends a sequence of probe messages to a set of destinations and measures the latency of a link as the difference in the round-trip times of the two probe messages to the endpoints of the link. A benefit of path-oriented tools is that they do not require special monitoring agents to be run at each node. However, a node with such a path-oriented monitoring tool, termed a monitoring station, is able to measure latencies and monitor faults for only a limited set of links in the node's routing tree (e.g., shortest path tree). Thus, monitoring stations need to be deployed at a few strategic points in the ISP or enterprise IP network so as to maximize network coverage while minimizing hardware and software infrastructure costs, as well as maintenance costs for the stations.

The need for low-overhead network monitoring has prompted development of new monitoring platforms. The IDmaps project (see, Francis, et al., "An Architecture for a Global Internet Host Distance Estimation Service," in Proceedings of IEEE INFOCOM '99, New York City, N.Y., March 1999, incorporated herein by reference in its entirety) produces "latency maps" of the Internet using special measurement servers, called "tracers," that continually probe each other to determine their distance. These times are subsequently used to approximate the latency of arbitrary network paths. Different methods for distributing tracers in the Internet are described in Jamin, et al., "On the Placement of Internet Instrumentation," in Proceedings of IEEE INFOCOM '2000, Tel Aviv, Israel, March 2000 (incorporated herein by reference in its entirety), one of which is to place them such that the distance of each network node to the closest tracer is minimized.

A drawback of the IDMaps approach is that latency measurements may not be sufficiently accurate. Due to the small number of paths actually monitored, it is possible for errors to be introduced when round-trip times between tracers are used to approximate arbitrary path latencies.

Recently, Breitbart, et al., "Efficiently Monitoring Bandwidth and Latency in IP Networks," in Proceedings of the IEEE INFOCOM '2000, Tel-Aviv, Israel, March 2000 (incorporated herein by reference in its entirety), proposed a monitoring scheme where a single network operations center (NOC) performs all the required measurements. To monitor links not in its routing tree, the NOC uses the IP source routing option to explicitly route probe packets along the link. Unfortunately, due to security problems, many routers frequently disable the IP source routing option. Consequently, approaches that rely on explicitly routed probe messages for delay and fault monitoring are not feasible in many of today's ISP and enterprise environments.

In other recent work on monitoring, Shavitt, et al., "Computing the Unmeasured: An Algebraic Approach to Internet Mapping," in Proceedings of IEEE INFOCOM 2001, Alaska, April 2001, incorporated herein by reference in its entirety, proposes to solve a linear system of equations to compute delays for smaller path segments from a given a set of end-to-end delay measurements for paths in the network. Similarly, Bu, et al., "Network Tomography on General Topologies," in Proceedings of the ACM SIGMETRICS, June 2002 (incorporated herein by reference in its entirety) considers the problem of inferring link-level loss rates and delays from end-to-end multicast measurements for a given collection of trees. Finally, Dilman, et al., "Efficient Reactive Monitoring," in Proceedings of the IEEE INFOCOM '2001, Alaska, April 2001 (incorporated herein by reference in its entirety) studies ways to minimize the monitoring communication overhead for detecting alarm conditions due to threshold violations.

Reddy, et al., "Fault Isolation in Multicast Trees," in Proceedings of the ACM SIGCOMM, 2000 and Adler, et al., "Tree Layout for Internal Network Characterizations in Multicast Networks," in Proceedings of NGC '01, London, UK, November 2001 (both incorporated herein by reference in its entirety), consider the problem of fault isolation in the context of large multicast distribution trees. The schemes in Reddy, et al., supra, achieve some efficiency by having each receiver monitor only a portion of the path (in the tree) between it and the source, but require receivers to have some monitoring capability (e.g., the ability to do multicast traceroute).

Adler, et al., supra, focuses on the problem of determining the minimum cost set of multicast trees that cover links of interest in a network. Unfortunately, Adler, et al., supra, does not consider network failures or issues such as minimizing the monitoring overhead due to probe messages. Also, Adler, et al., supra, covers only links and not the problem of selecting the minimum number of monitoring stations whose routing trees cover links of interest; routing trees usually are more constrained (e.g., shortest path trees) than multicast trees.

Most of the systems for monitoring IP networks described above suffer from three major drawbacks. First, the systems do not guarantee that all links of interest in the network are monitored, especially in the presence of network failures. Second, the systems have limited support for accurately pinpointing the location of a fault when a network link fails. Finally, the systems pay little or no attention to minimizing the overhead (due to additional probe messages) imposed by monitoring on the underlying production network. Accordingly, what is needed in the art is a system that fully and efficiently monitors link latencies and faults in an IP network using path-oriented tools.

SUMMARY OF THE INVENTION

Disclosed and claimed herein is a novel two-phased technique for fully and efficiently monitoring link latencies and faults in an ISP or Enterprise IP network, using path-oriented tools. Some embodiments of the technique are failure-resilient, and ensure complete coverage of measurements by selecting monitoring stations such that each network link is always in the routing tree of some station. The technique also reduces the monitoring overhead (cost), which consists of two cost components: (1) the infrastructure and maintenance costs associated with monitoring stations and (2) the additional network traffic due to probe messages. Minimizing the latter is especially important when information is collected frequently (e.g., every 15 minutes) to monitor continually the state and evolution of the network.

To address the above-discussed deficiencies of the prior art, the present invention provides a system for, and method of, monitoring link delays and faults in an IP network. In one embodiment, the system includes: (1) a monitoring station identifier that computes a set of monitoring stations that covers links in at least a portion of the network and (2) a probe message identifier, coupled to the monitoring station identifier, that computes a set of probe messages to be transmitted by at least ones of the set of monitoring stations such that the delays and faults can be determined.

In the first phase of one embodiment of the technique, a minimal set of monitoring stations (and their locations) that always cover all links in the network is computed, even if some links were to fail. In the second, subsequent phase of the one embodiment, the minimal set of probe messages transmitted by each station is computed such that the latency of every network link can be measured and every link failure can be detected. The following topics related to the novel technique will be addressed herein.

(1) Novel algorithms for station selection. The problem of computing the minimal set of stations whose routing trees cover all network links is NP-hard. The station selection problem maps to the known set cover problem (see, Chavatal, "A Greedy Algorithm for the Set-Covering Problem," Math. of Operation Research, Vol. 4, No. 3, pp 233-235, 1979, incorporated herein by reference). Thus, a polynomial-time greedy algorithm yields a solution that is within a logarithmic factor of the optimal. Further, the logarithmic factor is a lower bound on the degree of approximation achievable by any algorithm.

(2) Novel algorithms for probe message assignment. The problem of computing the optimal set of probe messages for measuring the latency of network links is also NP-hard. A polynomial-time greedy algorithm will be disclosed that computes a set of probe messages whose cost is within a factor of two of the optimal solution. Again, this approximation factor is quite close to the best possible approximation result.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 4A-4D together illustrate the effect of a link failure on a monitoring system constructed according to the principles of the present invention; and FIG. 5 illustrates a pseudocode listing of a greedy PMSC algorithm constructed according to the principles of the present invention.

DETAILED DESCRIPTION

Network Model

Figure 1:
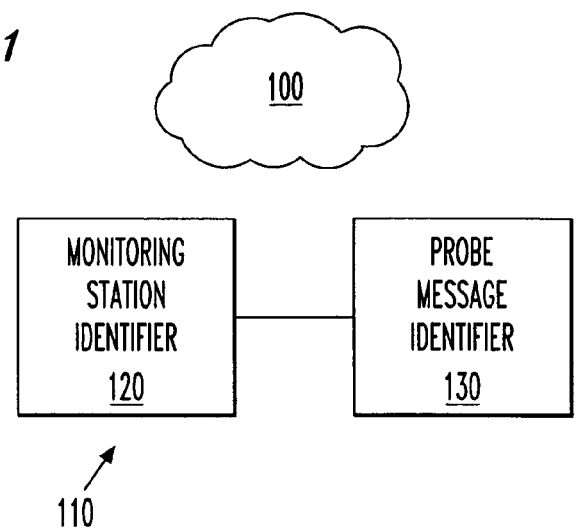
FIG. 1 illustrates a system for monitoring link delays and faults in an IP network constructed according to the principles of the present invention.

An undirected graph $G(V,E)$ is used to model a service provider or enterprise IP network, where the graph nodes, V, denote the network routers and the graph edges, E, represent the communication links connecting them.

$|V|$ and $|E|$ denote the number of nodes and edges, respectively, in the undirected graph $G(V,E)$. Further, $P_{s,t}$ denotes the path traversed by an IP packet from a source node to a destination node t. For purposes of the model, it is assumed that packets are forwarded through the network using standard IP forwarding techniques; that is, each node relies exclusively on the destination address in the packet to determine the next hop. The result of this assumption is that, for every node $x \in P_{s,t}$, $P_{x,t}$ is included in $P_{s,t}$. In addition, $P_{s,t}$ is also assumed to be the routing path in the opposite direction from node t to node s. This in turn implies that, for every node $x \in P_{s,t}$, $P_{s,x}$ is a prefix of $P_{s,t}$.

As a consequence, it follows that for every node $s \in V$, the subgraph obtained by merging all the paths $P_{s,t}$, for every $t \in V$, must have a tree topology. This tree for node s is referred to as the "routing tree" (RT) for s, denoted by $T_s$. Note that tree $T_s$ defines the routing paths from node s to all the other nodes in V, and vice versa.

For a service provider network consisting of a single OSPF area, the RT $T_s$ of node s is its shortest path tree. However, for networks consisting of multiple OSPF areas or autonomous systems (that exchange routing information using the Border Gateway Protocol, or BGP), packets between nodes may not necessarily follow shortest paths. In practice, the topology of RTs can be calculated by querying the routing tables of nodes.

In case a link f in the network fails, the IP routing protocols define a new delivery tree, $T_{s,f}$, for every node s∈V. (This typically takes a few seconds to a few tens of seconds depending on the IP routing protocol parameter settings.) The new tree $T_{s,f}$ has the property that every path $P_{s,t}$ in $T_s$, t∈V, that does not contain link f is also included in the tree $T_{s,f}$. The reason for this is that the failure of link f only affects those routing paths in $T_s$ that contain f. Thus, it may be possible to infer the topology of a significant portion of $T_{s,f}$ directly from $T_s$ without any knowledge of the route computation algorithms followed by the routers. Note that if f∉$T_s$, then $T_{s,f}$=$T_s$.

For purposes of the model, a positive cost $c_{s,t}$ is associated with sending a message along the path $P_{s,t}$ between any pair of nodes s, t∈V. For every intermediate node x∈$P_{s,t}$, both $c_{s,x}$ and $c_{x,t}$ are at most $c_{s,t}$ and $c_{s,x}+c_{x,t} \geq c_{s,t}$. Typical examples of this cost model are the fixed cost model, where all messages have the same cost, and the hop count model, where the message cost is the number of hops in its route. For this reason, $h_{s,t}$ denotes the number of hops in path $P_{s,t}$.

Delay Monitoring Framework

The methodology for complete measurement of round-trip latency of network links in an IP network will now be described. The methodology can also be extended to detect link failures as well as be resilient to them; these extensions will be described in more detail below.

For monitoring the round-trip delay of a link e∈E, a node s∈V, such that e belongs to s's RT (i.e., e∈$T_s$), must be selected as a monitoring station. Node s sends two probe messages (which may be implemented by using "ICMP ECHO REQUEST/REPLY" messages similar to ping) to the end-points of e, which travel almost identical routes, except for the link e. Upon receiving a probe message, the receiver replies immediately by sending a probe reply message to the monitoring station. Thus, the monitoring station s can calculate the round-trip delay of the link by measuring the difference in the round-trip times of the two probe messages (see also, skitter, described in CAIDA, supra).

From the above description, it follows that a monitoring station can only measure the delays of links in its RT. Consequently, a monitoring system designated for measuring the delays of all network links has to find a set of "monitoring stations" S⊆V and a "probe message assignment" $\mathcal{A} \subset \{m(s,u)|s∈S, u∈V\}$, where each probe message m(s,u) represents a probe message that is sent from the monitoring station s to node u. The set S and the probe message assignment $\mathcal{A}$ are required to satisfy two constraints:

(1) a "covering set" constraint that guarantees that all links are covered by the RTs of the nodes in S, i.e., $\cup_{s∈S} T_s = E$, and (2) a "covering assignment" constraint that ensures that for every edge e=(u,v)∈E, a node s∈S exists such that e ∈$T_s$ and $\mathcal{A}$ contains the messages m(s,u) and m(s,v). (If one of the endpoints of e=(u,v) is in S, say u∈S, then $\mathcal{A}$ is only required to contain the message m(u,v).)

The covering assignment constraint essentially ensures that every link is monitored by some stations. A pair (S,A) that satisfies the above constraints is referred to as a "feasible solution." Note that although only the problem of monitoring all network links is described herein, the results also apply to the problem of monitoring only a subset of links of interest.

As stated above, the overhead (cost) of a monitoring system consists of two cost components, the overhead of installing and maintaining the monitoring stations, and the communication cost of sending probe messages. In practice, it is preferable to have as few stations as possible since this reduces operational costs. Therefore, a two-phased approach is adopted to optimizing monitoring overheads. In the first phase, an optimal set of monitoring stations is selected, while in the second, the optimal probe messages are computed for the selected stations. An "optimal station selection" S is one that satisfies the covering set requirement while simultaneously minimizing the number of stations. After selecting the monitoring stations S, an "optimal probe message assignment" $\mathcal{A}$ is one that satisfies the covering assignment constraint and minimizes the sum $$\sum_{m(s,v)∈A} c_{s,v}.$$

Note that choosing $c_{s,v}=1$ essentially results in an assignment $\mathcal{A}$ with the minimum number of probe messages while choosing $c_{s,v}$ to be the hop distance, $h_{s,v}$, yields a set of probe messages that traverses the fewest possible network links.

A final component of the monitoring infrastructure described herein is the network operations center (NOC), which is responsible for coordinating the actions of the set of monitoring stations S. The NOC queries network nodes to determine their RTs, and subsequently uses these to compute a near-optimal set of stations and a probe message assignment for them, as described below.

Referring initially to FIG. 1, illustrated is a system, generally designated 110, for monitoring link delays and faults in an IP network 100. The system 110 is associated with a NOC (not referenced) of the network 100 and includes a monitoring station identifier 120. The monitoring station identifier 120 computes a set of monitoring stations in the network 100 that covers links in at least a portion of the network 100. In the embodiment illustrated in FIG. 1, the monitoring station identifier 120 computes a minimal set of monitoring stations that covers an entirety of the links in the network 100. Because computing the minimal set of monitoring stations is an NP-hard problem, the monitoring station identifier 120 preferably employs polynomial-time approximation algorithms (to be described below) to compute the set of monitoring stations.

The system 110 further includes a probe message identifier 130. The probe message identifier 130 is associated with the monitoring station identifier 120. The probe message identifier 130 computes a set of probe messages to be transmitted by at least ones of the set of monitoring stations such that the delays and faults can be determined. In the embodiment illustrated in FIG. 1, the probe message identifier 130 computes a minimal set of monitoring stations.

As with computing the minimal set of monitoring stations, computing the minimal set of probe messages is an NP-hard problem. Therefore, the monitoring station identifier 120 preferably employs polynomial-time approximation algorithms (also to be described below) to compute the set of monitoring stations.

The "cost" of the minimal set of probe messages is determined by the cost of sending the probe messages through the network. The probe messages can be assumed to have identical message costs, message costs that are based on a number of hops to be made by the probe messages or any other basis as a particular application may find advantageous.

Figure 2:
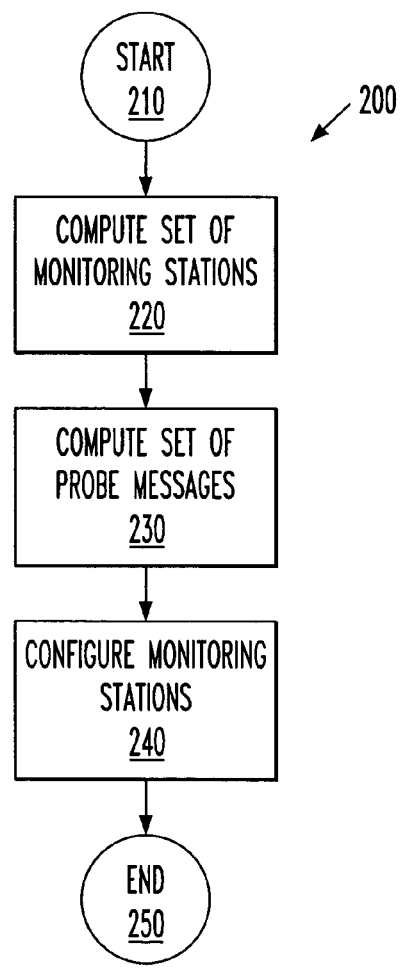
FIG. 2 illustrates a method of monitoring link delays and faults in an IP network carried out according to the principles of the present invention.

FIG. 2 illustrates a method, generally designated 200, of monitoring link delays and faults in an IP network carried out according to the principles of the present invention. The method 200 begins in a start step 210, wherein it is desired to monitor the IP network in an efficient and thorough manner.

The method proceeds to a step 220, in which a set of monitoring stations that covers links in at least a portion of the network is computed. As stated above, the set of monitoring stations is preferably a minimal set of stations having associated routing trees that cover all considered sets of monitored links.

The method 200 then proceeds to a step 230, in which a set of probe messages to be transmitted by at least ones of the set of monitoring stations is computed. Again, the set of probe messages is preferably a minimal cost set, and since the problem to be solved is NP-hard, an approximation algorithm that provides a near-optimal solution is presented herein.

Next, the various monitoring stations in the computed set of monitoring stations are configured for operation in a step 240. The monitoring stations are assigned probe messages to transmit so they can monitor their various assigned links such that delays and faults can be determined. The method ends in an end step 250.

Delay Monitoring Algorithms

Polynomial-time approximation algorithms will now be presented for solving the station selection and probe message assignment problems in the context of a scenario that does not consider network link failures. A $\ln(|V|)$-approximation algorithm for station selection and a 2-approximation algorithm for probe message assignment will be set forth.

Of great interest is solving the problem of covering all graph edges with a small number of RTs. The "Link Monitoring Problem," or LM, is therefore defined as follows. Given a graph $G(V,E)$ and an RT, $T_v$, for every node $v \in V$, find the smallest subset $S \subseteq V$ such that $\cup_{v \in S} T_v = E$.

For the clarity of presentation, only the unweighted version of the LM problem is considered. However, the results can easily be extended to the weighted version of the problem, where each node has an associated cost, and a set $S \subseteq V$ that minimizes the total cost of the monitoring stations in S is sought. The latter can be used, for instance, to find a station selection when monitoring stations can be installed only at a restricted set of nodes. For restricting the station selection, nodes that cannot support monitoring stations are assigned infinite cost.

The LM problem is similar to the set cover (SC) problem, which is a well-known NP-hard problem. In an instance $I(Z, Q)$ of the SC problem, $Z = \{z_1, z_2, \ldots z_m\}$ is a universe of m elements and $Q = \{Q_1, Q_2, \ldots Q_n\}$ is a collection of n subsets of Z (assume that $\cup_{Q \in Q} Q = Z$). The SC problem seeks to find the smallest collection of subsets $S \subseteq Q$ such that their union contains all the elements in Z, i.e., $\cup_{Q \in S} Q = Z$.

Without setting forth the proof herein, the LM problem is NP-hard, even when the RT of each node is restricted to be its shortest path tree. Further, the lower bound of any approximation algorithm for the LM problem is $\frac{1}{2} \cdot \ln(|V|)$.

Figures 3, 4:
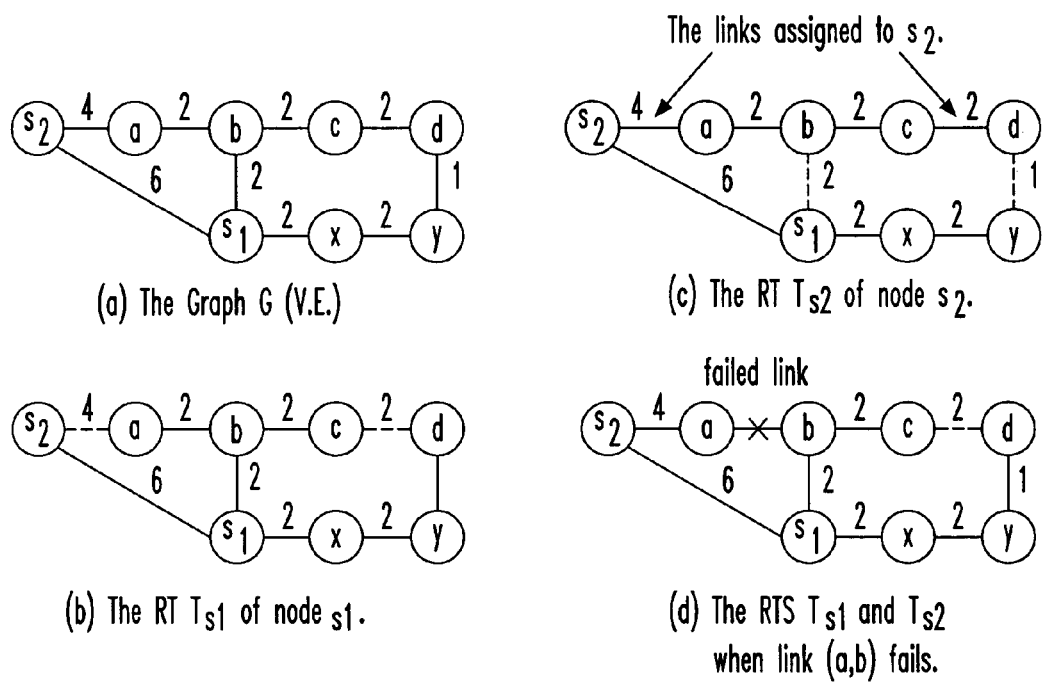
FIG. 3 illustrates a pseudocode listing of a greedy SC algorithm constructed according to the principles of the present invention.

An efficient algorithm for solving the LM problem will now be described. The algorithm maps the given instance of the LM problem, involving graph $G(V,E)$, to an instance of the SC problem, and then uses a greedy algorithm for solving the SC instance. In the mapping, the set of edges E defines the universe of elements Z, and the collection of sets Q includes the subsets $Q_v = \{e | e \in T_v\}$ for every node $v \in V$. Pseudocode for the greedy SC algorithm, depicted in FIG. 3, is an iterative algorithm that selects, in each iteration, the set Q with the maximum number of uncovered elements.

According to Chavatal, supra, the greedy algorithm is a $(\ln(\Delta)+1)$-approximation algorithm for the SC problem, where $\Delta$ is the size of the largest subset. Thus, since for the LM problem, every subset includes all the edges of the corresponding RT and its size is exactly $|V|-1$, the following result is obtained.

It will be stated without proof that the greedy algorithm computes a $(\ln(\Delta)+1)$-approximation for the LM problem. Note that the worst-case time complexity of the greedy algorithm can be shown to be $O(|V|^3)$.

Once a set S of monitoring stations has been selected, a probe message assignment $\mathcal{A}$ for measuring the latency of network links should be computed. As stated above, a "feasible probe message assignment" is a set of probe messages $\{m(s,u)|s \in S, u \in V\}$, where each $m(s,u)$ represents a probe message that is sent from station s to node u. Further, for every edge $e=(u,v) \in E$, a station $s \in S$ exists such that $e \in T_s$ and $\mathcal{A}$ contains the probe messages $m(s,u)$ and $m(s,v)$. (If s is one of the edge endpoints, say node v, then the probe message $m(s,v)$ is omitted from $\mathcal{A}$.) The cost of a probe message assignment $\mathcal{A}$ is $$COST_{\mathcal{A}} = \sum_{m(s,u) \in \mathcal{A}} c(s,u)$$

and the "optimal probe message assignment" is the one with the minimum cost.

As with the LM problem, computing the optimal probe message assignment is NP-hard.

A simple probe message assignment algorithm that computes an assignment whose cost is within a factor of two of the optimal solution will now be described. Consider a set of monitoring stations S and for every edge $e \in E$, let $S_e = \{s | s \in S \wedge e \in T_s\}$ be the set of stations that can monitor e. For each edge $e=(u,v) \in E$, the algorithm selects as the monitoring station of e the node $s_e \in S_e$ for which the cost $c_{s',u} + c_{s',v}$ is minimum. In case of ties (occurring when multiple stations have the same cost), the algorithm selects $s_e$ to be the station with the minimum identifier among the tied stations. Then, it adds the probe messages $m(s_e,u)$ and $m(s_e,v)$ to $\mathcal{A}$. It will be stated without proof that the approximation ratio of the simple probe message assignment algorithm is two.

Delay Monitoring With Fault Detection

The probe message-based delay monitoring system described in the previous section can be extended to also detect network link failures. Using probe messages to pinpoint network faults has several advantages over monitoring routing protocol messages (e.g., OSPF LSAs) or using SNMP traps to identify failed links. First, probe message-based techniques are routing protocol agnostic; as a result, they can be used with a range of protocols, such as Open Shortest Path First (OSPF), Intermediate System to Intermediate System (IS-IS) or Routing Information Protocol (RIP). Second, SNMP trap messages may be somewhat unreliable, since they are transported using Unreliable Data Protocol (UDP) datagrams. The probe message-based fault detection algorithms described herein can be used either stand-alone, or in conjunction with SNMP traps, to build a robust infrastructure for accurately pinpointing network faults.

The probe message-based methodology set forth above, while suitable for estimating link delays, can, with modification be able to identify failed network links.

EXAMPLE 1

Consider the graph G(V,E) depicted in FIG. 4A, where each link is labeled with its weight.

Let $S=\{s_1,s_2\}$ be the set of selected monitoring stations. The RTs $T_{s^1}$ and $T_{s^2}$ are the shortest path trees rooted at nodes $s_1$ and $s_2$ as illustrated in FIGS. 4B and 4C, respectively. The simple probe message assignment algorithm assigns all graph links to be monitored by $s_1$ except the links $(s_2,a)$ and $(c,d)$ which are monitored by $s_2$. Note that $s_2$ transmits two probe messages $m(s_2,c)$ and $m(s_2,d)$ that traverse nodes a, b and c to measure the latency of link (c,d). Now, consider the failure of link (a,b) that causes the RTs of $s_1$ and $s_2$ to be modified as shown in FIG. 4D. (RTs typically adapt to failures in a few seconds or a few tens of seconds, depending on IP routing protocol parameter settings.) Specifically, the new RT for $s_1$ contains the link $(s_2,a)$ instead of (a,b), while the tree for $s_2$ contains the links $(s_1,b)$ and (y,d) instead of (a,b) and (c,d). Clearly, neither $s_1$ nor $s_2$ detects the failure of link (a,b), and further since the probe messages $m(s_2,c)$ and $m(s_2,d)$ traverse a diverse set of nodes ($\{s_1,b\}$ and $\{s_1,x,y\}$, respectively), they are no longer measure the latency of link (c,d).

The delay monitoring framework will now be extended also to detect link failures. The fault monitoring infrastructure described herein uses the same set of stations S used for delay monitoring—thus, the stations in S cover all links in the network. However, as shown above in Example 1, a new set of probe messages is required for identifying failed links (in addition to measuring link delays).

To develop the new set of probe messages, an algorithm for computing a near-optimal set of probe messages for detecting the failure of a network link will first be described. Then, an algorithm for accurately pinpointing the faulty link based on probe message results from the various stations will be described. The algorithms can easily be extended to handle node failures in addition.

Detecting a Network Link Failure

In fault monitoring methodology described herein, probe messages use the time-to-live (TTL) field of the IP header. The TTL field provides an efficient way to bound the number of hops that an IP packet traverses in its path (see, Richard, supra). Essentially, the TTL field of an IP packet is initialized by the source node to the maximum number of hops that the packet is allowed to traverse. Each router along the path followed by the packet then decrements the TTL value by one until it reaches zero. When a router decrements the TTL field to zero, it discards the packet and sends an ICMP "time expired" reply to the packet's source node. (This method is used by the traceroute application for discovering routers in the path between a given pair of nodes.)

Now suppose that link $e=(u,v)\in T_s$ should be monitored by station $s\in S$, and let node v be the node that is further from S. The appropriate strategy is to set the TTL values in the two probe messages m(s,u) and m(s,v) that measure link e's delay such that the probe messages can also detect changes in $T_s$ due to e's failure. One option is to set the TTL field of probe message m(s,v) to $h_{s,v}$, the hop distance in $T_s$ between nodes s and v. This guarantees that the probe message does not traverse more than $h_{s,v}$ hops. Thus, a reply message from a node other than v indicates a link failure along the path $P_{s,v}$ in $T_s$. While this observation enables some failures to be detected, others may be missed. Example 2 illustrates.

EXAMPLE 2

Consider the graph in Example 1, and assume a failure of the link (a,b) monitored by $s_1$. The hop distances from $s_1$ to nodes a, b before the failure are $h_{s^1,b}=1$ and $h_{s^1,a}=2$, and they remain the same after (a,b) fails. Thus, $s_1$ cannot detect the failure of link (a,b).

The above problem can be fixed by associating the same destination address with the two probe messages for link e=(u,v). Let m(s,t,h) denote the probe message sent by source s to a destination node t with TTL value set to h. Further, let $R_{m(s,t,h)}$ be the node that replies to the probe message. Assuming that node u is closer to station s than node v, i.e., $h_{s,u}<h_{s,v}$, station s can monitor both the delay as well as failure of link e by sending the following two probe messages: $m(s,v,h_{s,u})$ and $m(s,v,h_{s,v})$. These messages have the same destination, v, but they are sent by s with different TTL values.

Clearly, in the absence of failures, the reply for the first message is sent by node u while the reply for the second message is sent by node v, i.e., $m(s,v,h_{s,u})=u$ and $m(s,v,h_{s,v})=v$. Thus, the difference in the round-trip times of the two probe messages gives link e's delay. Further, if link e fails, and since u and v are no longer adjacent in the new RT $T_{s,e}$ for s, at least one of these replies will be originated by a different node. This means that either $R_{m(s,v,h^{s,u})}\neq u$ or $R_{m(s,v,h^{s,v})}\neq v$, or both.

Thus, the probe message assignment $\mathcal{A}$ essentially contains, for each edge e=(u,v), the probe messages $m(s_e,v,h_{s^e,u})$ and $m(s_e,v,h_{s^e,v})$, where $s_e\in S_e$ is the station for which $c_{s^e,u}+c_{s^e,v}$ is minimum (ties are broken in favor of stations with smaller identifiers). Further, if for e=(u,v), $R_{m(s^e,v,h^{se,u})}\neq u$ or $R_{m(s^e,v,h^{se,v})}\neq v$, then station $s_e$ informs the NOC that a network link has failed.

Revisiting Example 2, $s_1$ sends probe messages $m(s_1,a,1)$ and $m(s_1,a,2)$ to monitor link (a,b). In case link (a,b) fails, then with the new RT for $s_1$, $R_{m(s^1,a,1)}$ would be $s_2$ instead of b. Therefore, $s_1$ would detect the failure of link (a,b). The probe message assignment $\mathcal{A}$ described above thus monitors all network links for both delay as well as faults. Further, it will be stated without proof that the cost of probe message assignment $\mathcal{A}$ is within a factor of two of the optimal probe message assignment.

Let $P_{s,e}$ denote the path between station s and link e (and including e) in $T_s$. While probe message assignment $\mathcal{A}$ ensures that any failure of a link e is detected by the station s that monitors e, s may not always be able to infer (by itself) whether the faulty link is e or some other link in $P_{s,e}$. The reason for this is that replies for the probe messages for link e may be affected by the failure of a link f in $P_{s,e}$, and f may not be monitored by s. Thus, s may be unable to conclude whether the erroneous replies to e's probe messages were caused by the failure of e or f.

EXAMPLE 3

Consider the graph in Example 1 where station $s_2$ monitors links $(s_2,a)$ and (c,d), and $s_1$ monitors the remaining links. Suppose that for probe message $m(s_2,d,3)$ that monitors link (c,d), $R_{m(s^2,d,3)}$ is y instead of c. This could be the result of the failure of either link (c,d) or (a,b). In both cases, the new routing path from $s_2$ to d traverses nodes $s_1$, x and y. Since $s_2$ does not monitor link (a,b), it cannot conclude, by itself, which of links (a,b) or (c,d) have failed.

An algorithm for accurately pinpointing the faulty link, in which each monitoring station sends its failure information to the NOC, will now be presented.

As shown in Example 3, with probe message assignment $\mathcal{A}$, when a link fails, the station monitoring the link detects the failure, but may not always be able to accurately identify the location of the failed link. However, station s can narrow down the possible candidates to links in the path connecting it to the failed link.

It will be stated without proof that, if $R_{m(s,v,h^{s,u})} \neq u$ or $R_{m(s,v,h^{s,v})} \neq v$ for link (u,v) monitored by station s, a failure has occurred along the path $P_{s,v}$ in $T_s$. It will now be shown how this fact can be used to identify the faulty link after a monitoring station s detects a failure. A single link failure is assumed, since the likelihood of multiple concurrent link failures within a short time interval is very small.

Let $E_s \subseteq E$ be the set of links monitored by a station $s \in S$ as a result of probe message assignment $\mathcal{A}$. Since a link failure may affect the paths of multiple probe messages sent by s, $F_s \subseteq E_s$ denotes the set of links $(u,v) \in E_s$ for which $R_{m(s,v,h^{s,u})} \neq u$ or $R_{m(s,v,h^{s,v})} \neq v$. When a station s concludes a failure, the station s computes the set $F_s$, and then finds the link $f_s \in F_s$ closest to s. Thus, no other link $e \in F_s$ is contained in the path $P_{s,f}$. As concluded previously, the faulty link must be included in the path $P_{s,f}$.

Clearly, if all the links in path $P_{s,f}$ are in $E_s$, then $f_s$ must be the failed link, since none of the other links in $P_{s,f}$ are in $F_s$. However, it is possible that some links in $P_{s,f}$ are not in $E_s$ (in Example 3, link (a,b) is not in $P_{s_2,(c,d)}$). Thus, s cannot conclude that $f_s$ is the failed link, since a link in $P_{s,f}-E_s$ may have failed. One option is for s to send additional probe messages, $m(s,v,h_{s,u})$ and $m(s,v,h_{s,v})$ for monitoring every link $(u,v) \in P_{s,f}-E_s$. Station s can then declare the faulty link to be the link $(u',v')$ closest to it in $P_{s,f}-E_s$ for which $R_{m(s,v,h^{s,u})} \neq u'$ or $R_{m(s,v,h^{s,v})} \neq v'$. With this technique, s sends $O(|V|)$ additional messages in the worst case. Further, since the faulty link may be detected by multiple monitoring stations, the total number of extra messages is $O(|S| \cdot |V|)$.

A centralized approach will now be presented for identifying the faulty link at the system NOC, without sending additional probe messages. In the NOC-based approach, each station s that detects a failure transmits to the NOC a "FAULT DETECTED" message containing the identity of link $f_s$. When the NOC receives the message, the NOC calculates the set $C_s$ of the potentially failed links detected by s as:

$$C_s = (P_{s,f} - E_s) \cup \{f_s\}$$

Note that the NOC may receive a FAULT DETECTED message from more than one station, and for these stations $C_s$ is non-empty. For the remaining stations, $C_s = \emptyset$. Once the NOC has received the FAULT DETECTED message from all stations that detected a failure, it computes the identity of the faulty link by evaluating the following expression:

$$C = \bigcap_{C_s \neq \emptyset} C_s - \bigcup_{C_s = \emptyset} E_s \qquad (1)$$

In Equation (1), the second term prunes from the candidate set links that are monitored by stations that did not detect failures.

EXAMPLE 4

Consider the graph in Example 1 where station $s_2$ monitors links $(s_2,a)$ and (c,d), and $s_1$ monitors the remaining links. Suppose that link (a,b) fails. Both $s_1$ and $s_2$ detect a failure, and send to the NOC FAULT DETECTED messages containing links (a,b) and (c,d), respectively. The NOC calculates the sets $C_{s_1} = \{(a,b)\}$ and $C_{s_2} = \{(a,b),(b,c),(c,d)\}$, and computes the set $C = C_{s_1} \cap C_{s_2} = \{(a,b)\}$, that contains only the failed link (a,b). It will be stated without proof that set C in Equation (1) contains only the faulty link f.

Robust Link Monitoring

A system for monitoring links is "robust" if it continues to monitor network links even if one or more links in the network fail. A key challenge in designing such a robust monitoring system is selecting a set of stations whose RTs always cover all the active network links. The problem is that when a link f fails, the new RT $T_{s,f}$ for a station s may be different from $T_s$, the RT prior to the failure. As a result, a station s that was responsible for monitoring a link $e \in T_s$ may be unable to monitor the link once link f fails. The problem is further complicated by the fact that the RTs $T_{s,f}$ for the various stations may not be known in advance (when stations are selected).

As an example, consider the graph in Example 1 with RTs $T_{s_1}$ and $T_{s_2}$ as shown in FIGS. 4B and 4C, respectively. The failure of link f=(a,b) causes the RTs of $s_1$ and $s_2$ to be modified as shown in FIG. 4D. Clearly, link $(c,d) \in T_{s_1}$ can no longer be monitored after f fails, since $(c,d) \notin T_{s_2,f}$. Thus, the monitoring system (with stations $s_1$ and $s_2$) in FIG. 4A is not robust.

Now, the problem of efficient placement of monitoring stations that guarantees delay and fault monitoring of all active links in the presence of at most K-1 failures will be considered. This problem is referred to as the "K-Fault Resilient Monitoring" (K-FRM) problem, for which a solution with an approximation ratio of ln(|E|) will be developed. Once the set S of stations is computed, the probe message assignment is computed as described above. For simplicity, only link failures will be considered; however, the general approach can be easily enhanced to support nodes failures as well.

A set S of stations is resilient to one fault if and only if the set s satisfies the following "fault resilience" property: For every link $f \in E$, for every other link $e \neq f$, $e \in T_{s,f}$ for some station $s \in S$. The fault resilience property ensures that, when an arbitrary link fails, every other active link is contained in the new RT of some station in S. However, finding a set of stations that satisfies the property may be difficult since the trees $T_{s,f}$ may not be known in advance. Further, the property becomes extremely complex when K-fault resilience is considered, since any combination of K-1 links can potentially fail.

Due to the above-mentioned reasons, S is instead required to satisfy a stronger but simpler condition that implies the above fault resilience property. The condition does not rely on the knowledge of $T_{s,f}$, but exploits the fact that $T_s$ and $T_{s,f}$ are identical with respect to paths that do not contain the failed link f. Let $F_e(T_s)$ be the parent link of link e in $T_s$. Then the stronger condition is based on the key observation that S is resilient to a single link failure if one of the following two conditions holds for every link $e \in E$:

(1) one of e's endpoints is in S, or (2) link e is in the RTs of at least two monitoring stations $s_1, s_2 \in S$, and $F_e(T_{s^1}) \neq F_e(T_{s^2})$.

The following proposition presents a more general sufficient condition for any K-fault resilient monitoring system: a set S of monitoring stations is K-fault resilient if for every link $e=(u,v) \in E$, at least one of the following conditions is satisfied:

(1) one of nodes u or v is in S, or (2) K nodes are in S, denoted by $S_e = \{s_1, s_2, \ldots, s_K\}$, whose RTs $T_{s^i}$ contain link e, and for every pair of distinct nodes $s_i, s_j \in S_e$, it is the case that $F_e(T_{s^i}) \neq F_e(T_{s^j})$.

Thus, the K-FRM Problem is defined as follows. Given are a constant K, a graph G(V,E) and an RT $T_v$ for every node $v \in V$. Find the smallest subset $S \subseteq V$ such that, for every link $e \in E$, at least one of the following two conditions is satisfied.

(1) one of nodes u or v is in S, or (2) K nodes are in S, denoted by $S_e = \{s_1, s_2, \ldots, s_K\}$, whose RTs $T_{s^i}$ contain link e, and for every pair of distinct nodes $s_i, s_j \in S_e$, it is the case that $F_e(T_{s^i}) \neq F_e(T_{s^j})$.

The K-FRM problem is a generalization of the LM problem defined above, and any instance of the LM problem can be represented as an instance of the K-FRM problem with K=1. Because the LM problem is NP-hard, and because the lower bound of any approximation algorithm for the LM problem is $\frac{1}{2} \cdot \ln(|V|)$, it will be stated without proof that the K-FRM problem is also NP-hard. Further, the lower bound of any approximation algorithm for the problem is $O(\ln(|V|))$.

To solve the K-FRM problem, it is mapped to an extended version of the set cover (SC) problem referred to as the Partial Multi-Set Cover (PMSC) problem.

The PMSC Problem is defined as follows. Given are a constant K, a universe of elements Z, and the following two collections of subsets of Z: $\mathcal{Y} = \{Y_1, Y_2, \ldots, Y_m\}$ and $Q = \{Q_1, Q_2, \ldots Q_m\}$. Each $Y_j \in \mathcal{Y}$ contains at least K elements, and is disjoint from other members of $\mathcal{Y}$. Find the smallest collection $S \subseteq Q$ such that for every $Y_j \in \mathcal{Y}$, $|\cup(S) \cap Y_j| \geq K$, where $\cup(S) = \cup_{Q \in S} Q$ is the union of the collection S.

The PMSC problem is more general than the SC problem. Every instance I(Z,Q) of the SC problem can be reduced to an instance of the PMSC problem by selecting K=1 and defining the collection $\mathcal{Y} = \{\{z\} | \forall z \in Z\}$ in which every subset $Y_i$ contains a single element of Z. Thus, the optimal solution of the calculated PMSC instance is also the optimal solution of the given SC instance, I(Z,Q). Therefore, PMSC is NP-hard, and it has a lower bound of at least $\ln(|Z|)$.

A greedy PMSC algorithm will now be described for solving the PMSC problem (see FIG. 5 for pseudocode). The greedy PMSC algorithm uses ideas similar to those employed by the greedy SC algorithm described above. More specifically, in each iteration, the greedy algorithm selects the most cost-effective set $Q_i^* \in Q$ until all the sets in $\mathcal{Y}$ are covered, as explained below. In the greedy PMSC algorithm, $S \subseteq Q$ is the collection of subsets that have been selected so far. We say that set $Y_j$ is "covered" by S if $\cup(S)$ contains at least K elements from $Y_j$, i.e., $|\cup(S) \cap Y_j| \geq K$. A variable $u_j$ is associated with each set $Y_j \in \mathcal{Y}$ that specifies the number of "uncovered" elements in $Y_j - \cup(S)$ that still need to be selected to cover $Y_j$. Thus, $u_j = 0$ if $Y_j$ is already covered, otherwise $u_j = K - |\cup(S) \cap Y_j|$. We use $$u_{total} = \sum_{j=1}^{m} u_j$$

to represent the total number of uncovered elements that should be selected for covering all the sets $Y_j \in \mathcal{Y}$. Note that when $u_{total} = 0$, the calculated selection S is a feasible solution. A value $n_i$ is associated with every set $Q_i \in Q$, $Q_i \notin S$, that is the total, over all uncovered sets $Y_j$, of the number of uncovered elements in $Y_j$ that are also contained in $Q_i$, and can be selected to cover $Y_j$. Thus, $$n_i = \sum_{j=1}^{m} \min\{u_j, |Q_i \cap (Y_i - \bigcup(S))|\}.$$

Note that adding $Q_i$ to S causes $u_{total}$ to decrease by $n_i$. Therefore, in each iteration, the greedy algorithm (see FIG. 5) adds to S, the "most cost-effective" set $Q_i \in Q-S$ that maximizes the ratio $n_i$.

The approximation ratio of the greedy PMSC algorithm is calculated using a technique similar to the one used for proving the approximation ratio of the greedy SC algorithm in Chavatal, supra. Consider the solution S returned by the greedy algorithm. Its cost is $COST(S) = |S|$. Let $Q_r^*$ be the set added to S in the $r^{th}$ iteration, and $n_r^*$ be the amount $u_{total}$ is reduced due to the addition of $Q_r^*$ to S. Since initially $u_{total} = mK$, it follows that $$\sum_{r=1}^{|S|} n_r^* = mK.$$

Let OPT be the optimal solution and let COST(OPT)=|OPT| denote its cost.

In the $r^{th}$ iteration of the greedy algorithm, $$n_r^* \geq \frac{\sum_{l=r}^{|S|} n_l^*}{\text{COST}(OPT)}.$$

From this, it follows that $$\text{COST}(S) = |S| \leq \text{COST}(OPT) \cdot \sum_{r=1}^{|S|} \frac{n_r^*}{\sum_{l=r}^{|S|} n_l^*}. \quad \text{Since} \sum_{n=1}^{|S|} n_r^* = mK,$$

a series of algebraic manipulations that will not be set forth here leads to the conclusion that the approximation ratio of the greedy PMSC algorithm is $\ln(K) + \ln(m) + 1$, where $m = \mathcal{Y}$.

The K-FRM problem is solved by first reducing it to the PMSC problem, and then applying the greedy PMSC algorithm shown in FIG. 5. In order to map a K-FRM instance involving the graph G(V,E) to a PMSC instance, the collections $\mathcal{Y}$ and Q need to be defined.

The collection $\mathcal{Y}$ contains m=|E| disjoint sets, where each set $Y_e \in \mathcal{Y}$ results from a link e∈E and contains at least K elements. The collection Q contains n=|V| sets, where each set $Q_v \in Q$ is derived from the RT $T_v$ of node V.

Let S⊆V be any subset of nodes and let S⊆Q be the corresponding collection of sets such that S={$Q_v$|v ∈S}. The reduction described herein guarantees that S is a feasible solution for the K-FRM problem if and only if S is a feasible solution for the corresponding PMSC instance. Here, a feasible solution S for the K-FRM problem is one for which every link e∈E satisfies one of the two conditions in the definition of the K-FRM problem set forth above, while S is a feasible solution for a PMSC instance if for every $Y_j \in \mathcal{Y}$, |∪(S)∩$Y_j$|≧K.

To achieve the above-mentioned goal, Z includes two types of elements, where each type is used to ensure that one of the conditions in the definition of the K-FRM problem set forth above is captured. Let $A_v$ and $A_e$ denote the set of links in E that are incident on node v and endpoints of edge e, respectively. For capturing the first condition, K different elements that are included in both sets $Y_e$ and $Q_v$ are defined for every node v∈V and every one of its outgoing links e∈$A_v$. Each element is represented by a triple <e,v,k>, for every 1≦k≦K. Thus, selecting a set $Q_v$ ensures that all the sets $Y_e$, e∈$A_v$, are covered.

The second condition is reflected in a more straightforward manner. For every link e=(u,v)∈E and each one of its adjacent links e'∈$A_e$, an element <e,e'> is defined and included in the set $Y_e$. The element <e,e'> is also included in the set $Q_v$ of every node v such that link e' is the parent of link e in the tree $T_v$, i.e., e'=$F_e(T_v)$. Thus, selecting one of the sets $Q_v$ ensures that a single uncovered element in $Y_e$ is covered.

In summary, for every e=(u,v)∈E, the set $Y_e \in \mathcal{Y}$ is defined as $$Y_e = \{<e,v,k>, <e,u,k> | 1 \leq k \leq K\} \cup \{<e,e'> | e' \in A_e\}$$

and for every node v ∈ V, the set $Q_v$ is defined as $$Q_v = \{<e,v,k> | e \in A_v, 1 \leq k \leq K\} \cup \{<e,F_e(T_v)> | e \in T_v, e \notin A_v\}$$

Suppose the greedy algorithm returns collection S as the solution to the above PMSC instance. Then, the solution to the original K-FRM problem is computed as S=(v|$Q_v$∈S). Clearly, since S covers every set $Y_e \in \mathcal{Y}$, every link e∈E either has an endpoint in S, or it appears in at least K RTs of nodes in S, with distinct parent links. Thus, S is a feasible solution to the K-FRM problem. Further, since the mapping between S and S does not alter the cost of the solutions (by virtue of the fact that, as stated above, the approximation ratio of the greedy PMSC algorithm is ln(K)+ln(m)), it follows that the cost of solution S is within a ln(K)+ln(|E|)+1 factor of the optimal solution to the K-FRM problem.

Note that the greedy algorithm takes $O(|V|^3)$ steps to solve the PMSC instance corresponding to the K-FRM problem, since |$Q_v$|=O(|V|) and |Q|=|V|.

Once a set S of K-fault resilient monitoring stations has been selected, initially each link e=(u,v) is monitored by the station s∈S such that e∈$T_s$ and $c_{s,u}+c_{s,v}$ is minimum. The NOC keeps track of failed network links in the variable X. When the NOC detects the failure of a network link f, it adds the link to X.

Further, for each link e currently being monitored by a station s such that $P_{s,e}$ contains the failed link f, the NOC computes a new station s' for monitoring e. The new station s' for e, in addition to satisfying the conditions e∈$T_s$ and $c_{s',u}$+$c_{s',v}$ is minimum, also needs to satisfy the condition that $P_{s',e} \cap X = \emptyset$. This ensures that the routing path from s' to e does not contain any of the failed links. Note that since S is K-fault resilient, at least K disjoint routing paths exist from a station in S to each link e not adjacent to a station in S. Thus, each active network link can be continually monitored by some station in S as long as the number of failures |X|<K. To monitor both the fault and delay of a link e=(u,v), the station s monitoring e sends the probe messages m(s,v,$h_{s,u}$) and m(s,v,$h_{s,v}$), as described above.

From the above, it is apparent that the two-phased monitoring methodology described herein ensures complete coverage of the network in the presence of link failures and ideally minimizes the monitoring overhead on the underlying production network. In the first phase of the approach described herein, the locations of a minimal set of monitoring stations was computed such that all network links are covered, even if some links in the network were to fail. Subsequently, in the second phase, the minimal set of probe messages to be sent by each station was computed such that the latency of every network link can be measured, and faulty network links can be isolated.

Unfortunately, both the station selection and the probe message assignment problems are NP-hard. However, polynomial-time greedy approximation algorithms described in response thereto achieve close to the best possible approximations to both the station selection and the probe message assignment problems.

Although the present invention has been described in detail, those skilled in the art should understand that they can make various changes, substitutions and alterations herein without departing from the spirit and scope of the invention in its broadest form.

What is claimed is:

1. A system for monitoring link delays and faults in an IP network, comprising:
    a monitoring station identifier that computes a set of monitoring stations for a plurality of network trees that covers links, including at least one link that is not included in at least one of said network trees, in at least a portion of said network, wherein each of said monitoring stations monitors one network tree, at least one monitoring station also monitoring said at least one link; and wherein said set of monitoring stations is selected as a minimal set; and
    a probe message identifier, coupled to said monitoring station identifier, that computes a set of probe messages to be transmitted by at least ones of said set of monitoring stations such that said delays and faults in specific links spanning said set of monitoring stations, including said at least one link, can be determined.

2. The system as recited in claim 1 wherein said set of probe messages is a minimal set.

3. The system as recited in claim 1 wherein said set of monitoring stations covers links in an entirety of said network.

4. The system as recited in claim 1 wherein said probe messages have a selected one of:
    identical message costs, and
    message costs that are based on a number of hops to be made by said probe messages.

5. The system of claim 1, wherein said probe message identifier, coupled to said monitoring station identifier, employs polynomial-time approximation to compute said set of probe messages to be transmitted by at least ones of said set of monitoring stations such that said delays and faults can be determined.

6. The system as recited in claim 1, wherein said minimal set of monitoring stations is an optimal set of monitoring stations.

7. A method of monitoring link delays and faults in an IP network, comprising:
computing a set of monitoring stations for a plurality of network trees that covers links, including at least one link that is not included in at least one of said network trees, in at least a portion of said network, wherein each of said monitoring stations monitors one network tree, at least one monitoring station also monitoring said at least one link, wherein said set of monitoring stations is selected as a minimal set; and
computing a set of probe messages to be transmitted by at least ones of said set of monitoring stations such that said delays and faults in specific links spanning said set of monitoring stations, including said at least one link, can be determined.

8. The method as recited in claim 7 wherein said set of probe messages is a minimal set.

9. The method as recited in claim 7 wherein said set of monitoring stations covers links in an entirety of said network.

10. The method as recited in claim 7 wherein said probe messages have a selected one of:
identical message costs, and message costs that are based on a number of hops to be made by said probe messages.

11. The method of claim 7, wherein said computing said set of monitoring stations comprises employing polynomial-time approximation algorithms.

12. A system for monitoring link delays and faults in an IP network, comprising:
a monitoring station identifier that employs polynomial-time approximation algorithms to compute a selected minimal set of monitoring stations for a plurality of network trees that covers links, including at least one link that is not included in at least one of said network trees, in at least a portion of said network, wherein each of said monitoring stations monitors one network tree, at least one monitoring station also monitoring said at least one link; and
a probe message identifier, coupled to said monitoring station identifier, that employs polynomial-time approximation algorithms to compute a minimal set of probe messages to be transmitted by at least ones of said set of monitoring stations such that said delays and faults, including said at least one link, can be determined.

13. The system as recited in claim 12 wherein said set of monitoring stations covers links in an entirety of said network.

14. The system as recited in claim 12 wherein said probe messages have a selected one of:
identical message costs, and
message costs that are based on a number of hops to be made by said probe messages.

15. The system as recited in claim 12 wherein said minimal set of monitoring stations guarantees delay and fault monitoring of all active links in a presence of at most K-1 failures.

16. The system as recited in claim 12 wherein said minimal set of monitoring stations always covers said links in said at least said portion of said network.

17. A system for monitoring link delays and faults in an IP network, comprising:
a monitoring station identifier that computes a set of monitoring stations for a plurality of network trees that covers links, including at least one link that is not included in at least one of said network trees, in at least a portion of said network, wherein each of said monitoring stations monitors one network tree, at least one monitoring station also monitoring said at least one link, wherein said set of monitoring stations is a minimal set; and
a probe message identifier, coupled to said monitoring station identifier, that computes a set of probe messages to be transmitted by at least ones of said set of monitoring stations such that said delays and faults in specific links spanning said set of monitoring stations, including said at least one link, can be determined,
wherein said minimal set of stations satisfies at least two constraints:
a covering set constraint; and
a covering assignment constraint.

18. A method of monitoring link delays and faults in an IP network, comprising:
computing a set of monitoring stations for a plurality of network trees that covers links, including at least one link that is not included in at least one of said network trees, in at least a portion of said network, wherein each of said monitoring stations monitors one network tree, and at least one monitoring station monitors said at least one link, wherein said set of monitoring stations is a minimal set; and
computing a set of probe messages to be transmitted by at least ones of said set of monitoring stations such that said delays and faults in specific links spanning said set of monitoring stations, including said at least one link, can be determined
wherein said minimal set of stations satisfies at least two constraints:
a covering set constraint; and
a covering assignment constraint.

* * * * *